(12) United States Patent
Konow Krause

(10) Patent No.: US 11,281,649 B2
(45) Date of Patent: *Mar. 22, 2022

(54) MECHANISM FOR EFFICIENT STORAGE OF GRAPH DATA

(71) Applicant: eBay Inc., San Jose, CA (US)

(72) Inventor: Roberto Daniel Konow Krause, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,293

(22) Filed: Jul. 28, 2020

(65) Prior Publication Data

US 2020/0356541 A1 Nov. 12, 2020

Related U.S. Application Data

(63) Continuation of application No. 15/220,211, filed on Jul. 26, 2016, now Pat. No. 10,747,741.

(51) Int. Cl.
*G06F 16/22* (2019.01)
*G06F 16/2455* (2019.01)

(52) U.S. Cl.
CPC ......... *G06F 16/2246* (2019.01); *G06F 16/22* (2019.01); *G06F 16/221* (2019.01); *G06F 16/2455* (2019.01)

(58) Field of Classification Search
None
See application file for complete search history.

(56) References Cited

U.S. PATENT DOCUMENTS

| 8,856,138 B1 | 10/2014 | Neubeck |
| 10,747,741 B2 | 8/2020 | Konow Krause |
| 2004/0103092 A1* | 5/2004 | Tuzhilin ............... G06F 16/283 |
| 2007/0203924 A1 | 8/2007 | Guha et al. |
| 2011/0153976 A1 | 6/2011 | Tamura et al. |

(Continued)

OTHER PUBLICATIONS

Brisaboa, Nieves R., Susana Ladra, and Gonzalo Navarro. "Compact representation of web graphs with extended functionality." Information Systems 39 (2014): 152-174. (Year: 2014).*

(Continued)

*Primary Examiner* — Alex Gofman
*Assistant Examiner* — Umar Mian
(74) *Attorney, Agent, or Firm* — Holland & Hart LLP

(57) ABSTRACT

Aspects of the present disclosure include a system comprising a machine-readable storage medium storing at least one program and computer-implemented methods for efficiently storing graph data. Consistent with some embodiments, the method includes using the graph data to construct a tree topology bitmap that represents a topology of a portion of the nodes in a tree data structure representing the graph data. The method further includes creating an archive bit array for the tree data structure that includes elements populated with a binary indicator of whether a corresponding leaf node includes a known entry. The method further includes creating a leaf values array comprising a known value for each leaf node in the tree data structure with a known entry. The method further includes storing, in a memory storage device, the tree topology, the archive bit array, and the leaf values array in association with an initial timestamp.

20 Claims, 11 Drawing Sheets

(56) References Cited

U.S. PATENT DOCUMENTS

| | | | |
|---|---|---|---|
| 2015/0019640 A1* | 1/2015 | Li | G06F 3/00 709/204 |
| 2016/0299991 A1 | 10/2016 | Hong et al. | |
| 2017/0004434 A1 | 1/2017 | Dey et al. | |
| 2018/0032559 A1 | 2/2018 | Konow Krause | |

OTHER PUBLICATIONS

Claude, Francisco, and Gonzalo Navarro. "Fast and compact web graph representations." ACM Transactions on the Web (TWEB) 4.4 (2010): 1-31. (Year: 2010).*

Hernández, Cecilia, and Gonzalo Navarro. "Compressed representation of web and social networks via dense subgraphs." International Symposium on String Processing and Information Retrieval. Springer, Berlin, Heidelberg, 2012. (Year: 2012).*

Advisory Action received for U.S. Appl. No. 15/220,211, dated Aug. 29, 2019, 6 pages.

Applicant Initiated Interview Summary Received for U.S. Appl. No. 15/220,211, dated Apr. 7, 2020, 3 Pages.

Applicant Initiated Interview Summary Received for U.S. Appl. No. 15/220,211 dated Jul. 31, 2019, 4 pages.

Final Office Action received for U.S. Appl. No. 15/220,211, dated May 10, 2019, 19 pages.

First Action Interview Office Action Summary received for U.S. Appl. No. 15/220,211, dated Oct. 4, 2018, 5 pages.

First Action Interview-Pre Interview Communication received for U.S. Appl. No. 15/220,211, dated Jun. 1, 2018, 4 pages.

Non-Final Office Action received for U.S. Appl. No. 15/220,211, dated Jan. 2, 2020, 23 pages.

Notice of Allowance received for U.S. Appl. No. 15/220,211, dated Apr. 10, 2020, 8 pages.

Cerdeira-Pena et al., "Self-Indexing RDF Archives", Data Compression Conference, 2016, 10 pages.

Ladra, "Algorithms and Compressed Data Structures for Information Retrieval", Tesis Doctoral, Apr. 2011, 306 Pages.

Response to Final Office Action Filed on Aug. 12, 2019, for U.S. Appl. No. 15/220,211,dated May 10, 2019, 10 pages.

Response to First Action Interview—Office Action Summary filed on Jan. 31, 2019, for U.S. Appl. No. 15/220,211, dated Oct. 4, 2018, 14 pages.

Response to First Action Interview—Pre-Interview Communication filed on Jun. 28, 2018, for U.S. Appl. No. 15/220,211, dated Jun. 1, 2018, 2 pages.

Response to Non-Final Office Action filed on Apr. 1, 2020 for U.S. Appl. No. 15/220,211, dated Jan. 2, 2020, 13 pages.

Brisaboa et al., "K2-Treaps: Range Top-k Queries in Compact Space", Retrieved from the Internet URL:<http://lbd.udc.es/Repository/Publications/Drafts/1424333845383_spire14.2.pdf>, 2014, 12 pages.

Brisaboa et al., "K2-Trees for Compact Web Graph Representation", String Processing and Information Retrieval, 2009, 10 pages.

* cited by examiner

MECHANISM FOR EFFICIENT STORAGE OF GRAPH DATA

CROSS REFERENCES

This application is a continuation of U.S. patent application Ser. No. 15/220,211 by Konow Krause, entitled "Mechanism for Efficient Storage of Graph Data," filed Jul. 26, 2016, which is incorporated herein in its entirety.

TECHNICAL FIELD

The present disclosure generally relates to machines configured to the technical field of special-purpose machines that facilitate management of databases including computerized variants of such special-purpose machines and improvements to such variants, and to the technologies by which such special-purpose machines become improved compared to other special-purpose machines that facilitate management of databases. In particular, the present disclosure addresses systems and methods for efficiently storing graph data in a data store.

BACKGROUND

Conventional content recommendation systems maintain graph structures such as matrices that include values associated with a group of users' interactions with content items (e.g., videos, books, and products). For example, a movie recommendation system may construct a recommendation matrix with columns that correspond to movies, rows that correspond to users, and entries within each element that include a score (e.g., on a scale of 1-5) assigned to the movie by a user, or a value of "0" if the user has not scored or viewed the movie. In another example, a product recommendation system may construct a recommendation matrix with columns that correspond to available products (e.g., having an associate product listing), rows that correspond to users, and entries within each element that include a binary value to indicate whether a particular user owns a particular product (e.g., "1" indicates the user owns the product and "0" indicates the user does not own the product). As another example, The primary task or goal of such recommendation systems is to predict how a user will interact with an item the user has not yet interacted with (e.g., instances in which an entry includes a "0" value). In the example of a product recommendation system, the goal is to identify what products the user will purchase based on what other products the user has purchased and what products other users have purchased. Similarly, in the example of a movie recommendation system, the goal of the system is to identify movies that a user is likely to enjoy watching based on how the user has rated other movies, and how other users rated movies.

When considering large systems with millions of items and millions of users, the storage space necessary to store the recommendation matrix is very large and can reach hundreds of thousands of terabytes. Though these recommendation matrices are very large, they are also typically very sparse because there are often many users and many items. A user may have watched hundreds of movies, or purchased hundreds of products, but with recommendation systems that involve millions of movies or products, most entries in the recommendation system will still have an unknown values (e.g., a null value). To store each one of these unknown values will still require at least one byte of information, thus resulting in inefficient utilization of storage space because a large portion of the space necessary to represent a recommendation matrix is needed simply to store the unknown values.

The storage space utilization issue is further compounded in instances in which the recommendation system also attempts to track timing of unknown entries changing to known entries (e.g., when a user rates a previously unrated movie). In these instances, the recommendation system must routinely create a new version of the recommendation matrix to track changes to the entries, and just a single additional version would double the amount of space necessary to represent the recommendation matrix and a record of the changes to its entries.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1A:
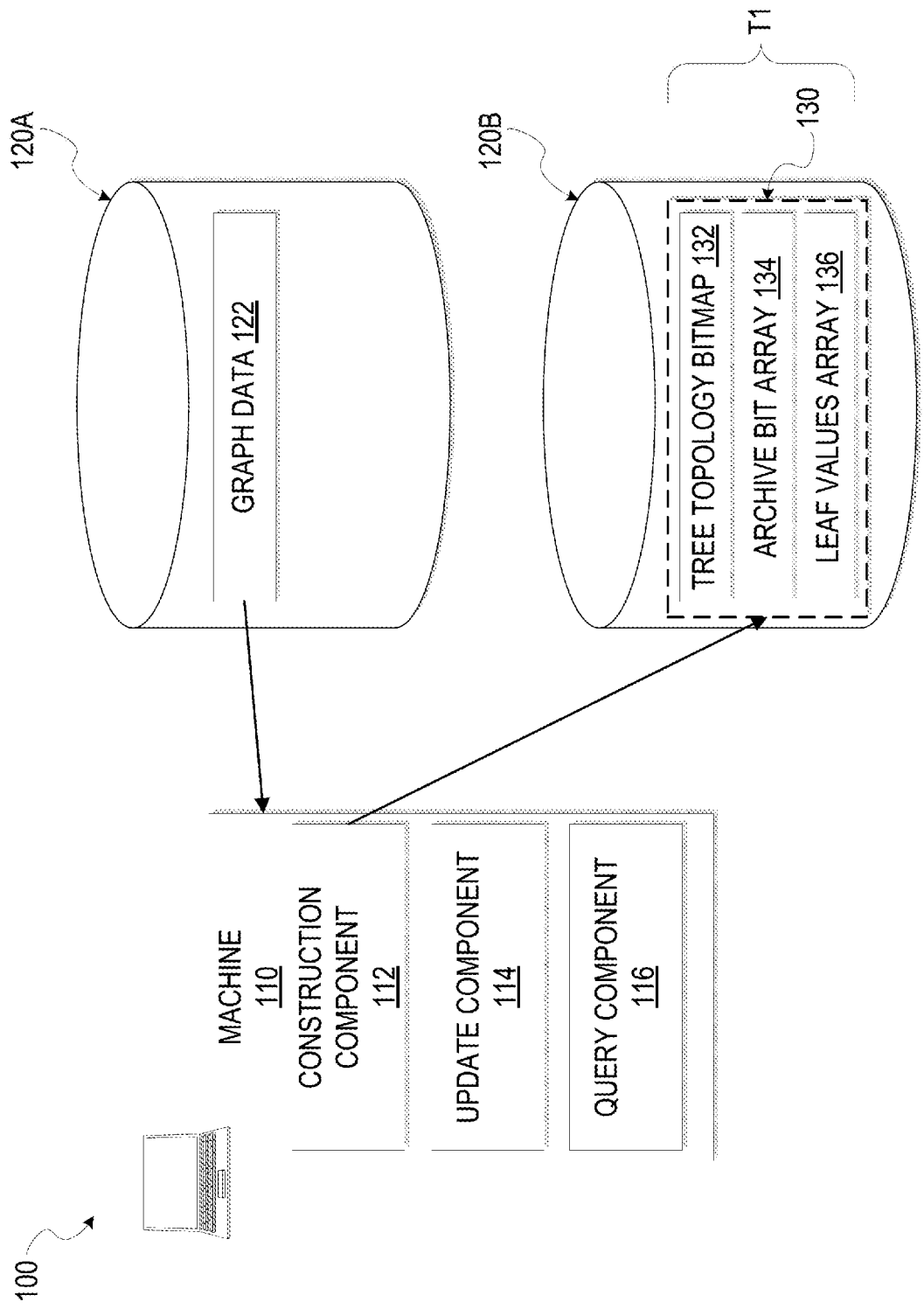
FIGS. 1A-1C are system diagrams depicting a machine configured for efficiently storing graph data, according to example embodiments.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Aspects of the present disclosure involve a system and methods for efficiently storing graph data such as a matrix (e.g., a recommendation matrix). To address the issues discussed above, the system utilizes a tree data structure to represent sparse graph data. In example embodiments, the system utilizes a $K^2$ tree. A $K^2$-tree is a data structure employed to compactly represent sparse matrices. The $K^2$-tree subdivides the matrix into $K^2$ submatrices of equal size. The submatrices are considered in row major order, top to bottom. Each one is represented with a bit, set to 1 if the submatrix contains at least one non-null cell. Each node whose bit is marked is recursively decomposed, subdividing its submatrix into $K^2$ children, and so on. The subdivision ends when a fully-zero submatrix is found or when we reach the individual cells. The $K^2$-tree is represented with two bitmaps: one that describes the topology of the tree (bitmap T) and is built by traversing the matrix tree level-wise, appending the $K^2$ bits of each node, excluding the parents of leaves. The other bitmap, L, that represents the leaves of tree, stores all the cell values.

Additionally, by adding an extra bit-vector for each period of time for each level of the tree (e.g., 1 bit per element), the system efficiently stores a history of changes of the matrix. As an example of such efficiency, by utilizing the foregoing methodologies the system can represent an element (e.g., a matrix cell) using 3-4 bits instead of 8 or 16, thereby reducing the space necessary to store graph data by at least 50% and allowing the system to traverse a history of values of the graph data as well.

The inventive subject matter of the present disclosure may be applicable to any context in which sparse graph data is stored. In one example, the inventive subject matter may find particular application with respect to storing recommendation matrices in recommendation systems. With reference to application in recommendation systems, the system can enable next-generation recommendation systems to use historical data of a user, thereby enhancing the precision and recall of the recommended items, as well as prediction of the ratings.

Consistent with some example embodiments, a method may include loading graph data comprising a set of values, and constructing a tree data structure (e.g., a $K^2$ tree) to represent the graph data. The method further includes constructing a tree topology bitmap using the graph data. The tree topology bitmap represents a topology of the tree data structure. The method further includes creating an archive bit array for the tree data structure using the graph data. The archive bit array comprises elements that correspond to leaf nodes in the tree data structure, and each element includes a binary indicator of whether the corresponding leaf node includes a known entry. The method further includes creating a leaf values array using the graph data. The leaf values array comprises a known value for each leaf node in the tree data structure with a known entry. The method further includes storing, in a memory storage device, the tree topology, the archive bit array, and the leaf values array in association with an initial timestamp.

In some instances, an update to the graph data is received (e.g., an updated data point). Consistent with some embodiments, upon loading an updated data point, the method may further include updating the tree topology bitmap, if necessary, creating an updated archive bit array, and creating an updated leaf values array based on the update to the graph data. The method further includes storing the updated tree topology bitmap, the updated archive bit array, and the updated leaf values array in the memory storage device in association with a subsequent time stamp. In this way, the method provides the ability to traverse a history of values of the graph data while achieving a reduction in the amount of space needed to store current and historical graph data.

Figure 1B:
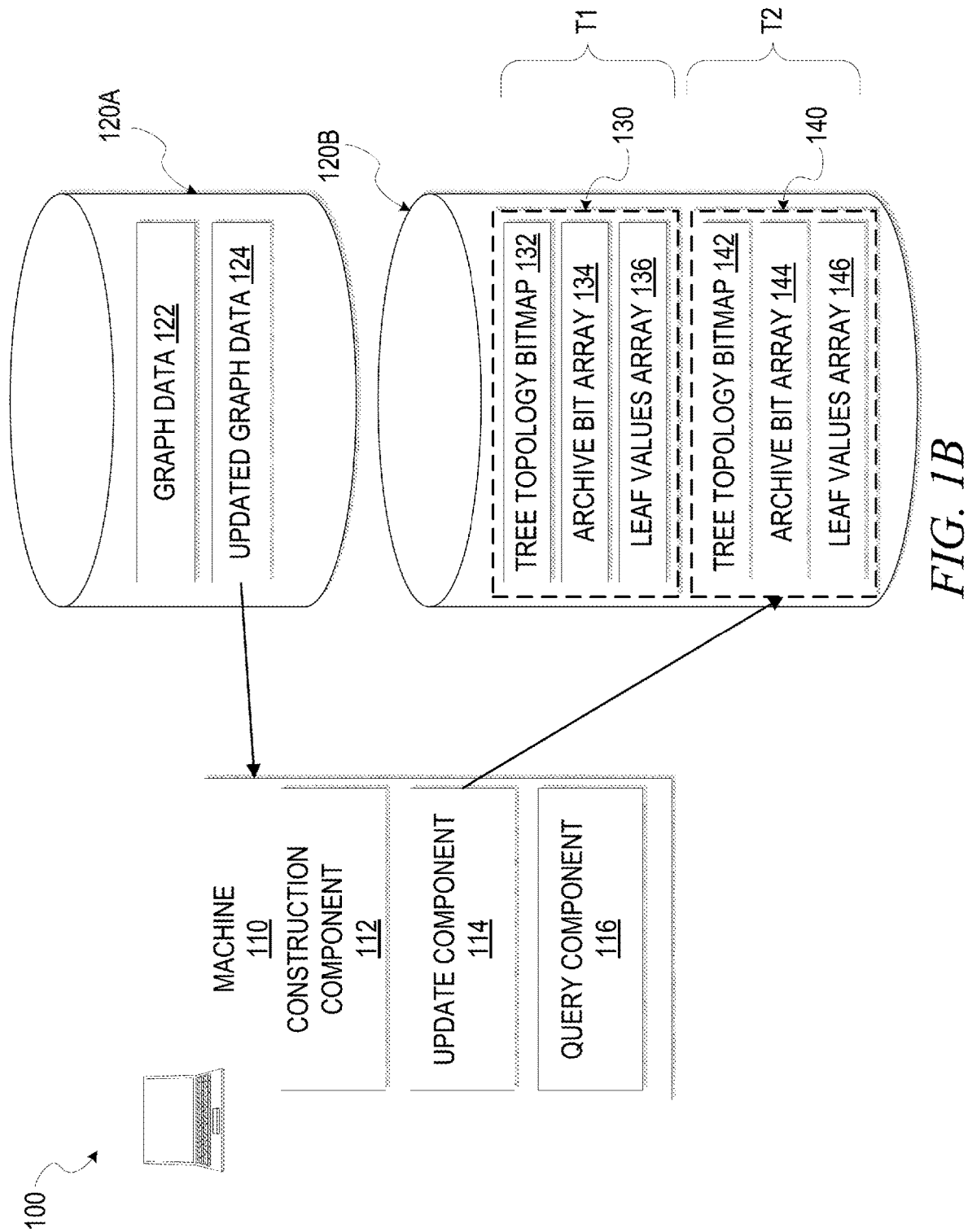
Figure 1C:
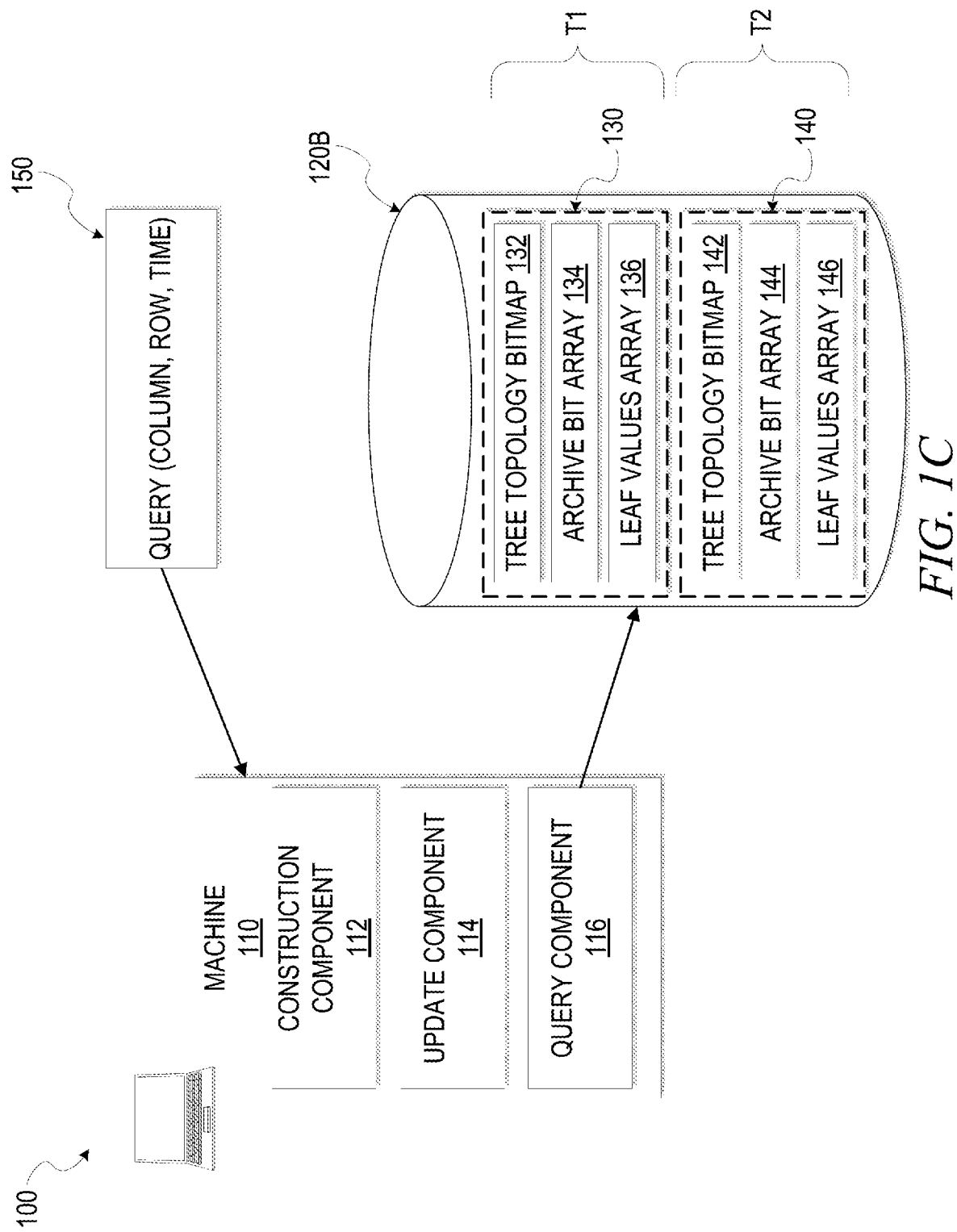

With reference to FIGS. 1A-1C, an example system 100 is shown. The system 100 includes a machine 110 in communication (e.g., via a bus, shared memory, a switch, or application programming interfaces (APIs)) with data stores 120A and 120B. The machine 110 may be a server or any other type of computing machine. The data stores 120A and 120B are repositories that include a machine-readable medium for persistently storing and managing collections of data (e.g., files or a database). For example, as shown in FIG. 1A, the data store 120A stores graph data 122 that includes data points (e.g., values) and linkages between the data points.

Figure 2A:
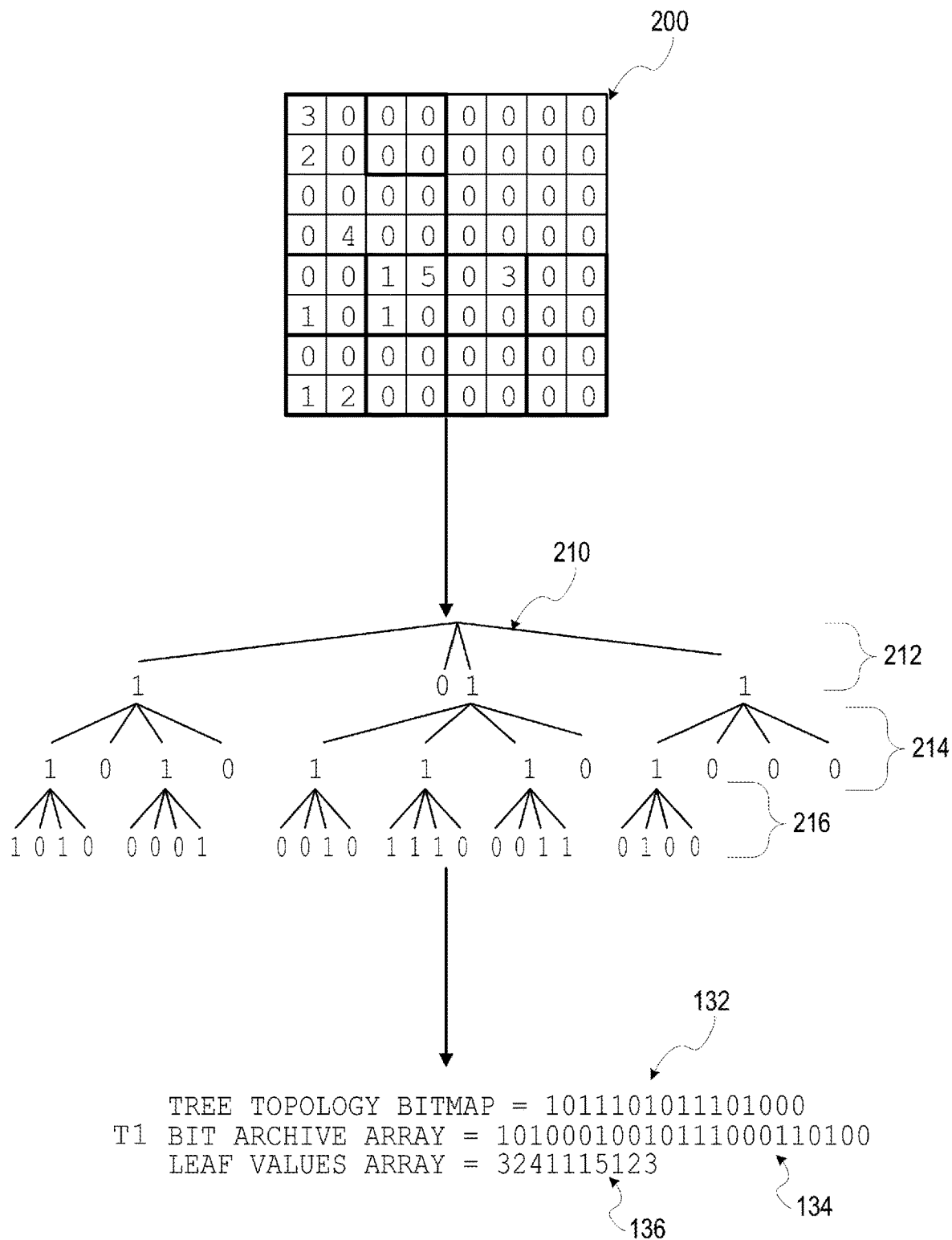
FIGS. 2A and 2B are conceptual diagrams depicting example processes performed by the machine, according to example embodiments.

In an example, the graph data 122 is a matrix such as matrix 200 illustrated in FIG. 2A. As shown in FIG. 2A, the matrix 200 is an array of values (e.g., numbers) arranged in rows and columns. The matrix 200 may, for example, correspond to a recommendation matrix where the rows represent users, the columns represent content items (e.g., products, movies, books, etc.) and individual entries (e.g., cells) represent user interactions with the content items such as a score (e.g., a ranking of 1 to 5 stars) or an action (e.g., viewed, shared, purchased, returned). Entries (e.g., values) within each cell of the matrix 200 may be considered data points of the graph data 122.

Returning to the discussion of FIG. 1A, the machine 110 is configured to generate a compact data structure 130 representing the graph data 122. To this end, the machine 110 includes a construction component 112 to construct the compact data structure 130 from the graph data 122. More specifically, the construction component 112 converts the graph data 122 to a tree data structure (e.g., a $K^2$ tree).

For example, FIG. 2A illustrates a tree data structure 210 generated from the matrix 200. As shown, the tree includes a plurality of nodes, each of which is a structure that contains a value (or condition). The construction component 112 generates the tree data structure 210 by partitioning the matrix 200 into four quadrants, and generating nodes at a first level of the tree data structure 210 (e.g., a level immediately below a root node) for each quadrant. If the quadrant includes a known value (e.g., a non-null value), the construction component 112 assigns a value of '1' to the corresponding node, and if the quadrant include no known values (e.g., all zero values), the construction component 112 assigns a value of '0' to the corresponding node. The construction component 112 creates subsequent levels in the tree data structure 210 by further portioning each quadrant into four sub-quadrants, and nodes in the subsequent levels are assigned values in the same manner as described above. This process is repeated for each level in the tree data structure 210 until the matrix 200 has been portioned down to the cell level. In other words, the matrix 200 is repeatedly partitioned until the partitions of the matrix 200 each include only one cell. In this way, a value of each leaf node of the tree data structure 210 (e.g., the nodes at the bottom most level of the tree data structure 210) indicate whether a specific cell in the matrix 200 includes a known value (e.g., a non-null value). Further details regarding the construction of the tree data structure 210 are discussed below in reference to FIG. 4, according to some embodiments.

Returning to the discussion of FIG. 1A, the construction component 112 uses the tree data structure 210 to construct a tree topology bitmap 132, an archive bit array 134, and leaf values array 136, which collectively make up the compact data structure 130 representing the graph data 122. The tree data structure 210 may be stored in a machine-readable medium (e.g., memory) of the machine 110 temporarily or may be persistently stored in the data store 120B along with the compact data structure 130.

The tree topology bitmap 132 is an array of values that represent a topology of a portion of the nodes (e.g., everything except the leaf node level) in the tree data structure. The archive bit array 134 is an array that includes elements corresponding to leaf nodes (e.g., nodes having no child nodes) of the tree data structure, and each element includes the value of a corresponding leaf node. The value of the corresponding leaf node provides an indication of whether the corresponding element in the graph data 122 includes a known value. The leaf values array 136 is an array that includes a value for each leaf node with a known value. The tree topology bitmap 132, the archive bit array 134, and the leaf values array 136 may be stored together in the data store 120B in association with a first timestamp ("T1").

As an example, FIG. 2A illustrates the tree topology bitmap 132, the archive bit array 134, and the leaf values array 136 generated from the tree data structure 210. As shown, the tree topology bitmap 132 comprises the array "1011101011101000," which corresponds to node levels 212 and 214 (e.g., the non-leaf node levels) of the data tree structure 210; the archive bit array 134 comprises the array "10100010010111000110100," which corresponds to the leaf nodes in leaf node level 216 (e.g., nodes at the bottom most level); and the leaf values array 136 comprises the array "3241115123," which correspond to cells in the matrix 200 with known values. Further, as shown in FIG. 2A, the tree topology bitmap 132, the archive bit array 134, and the leaf values array 136 are associated with a first timestamp ("T1"). Further details regarding the construction of the compact data structure 130 are discussed below in reference to FIGS. 3-5, according to some embodiments.

As illustrated in FIG. 1B, in some instances, updates to one or more data points in the graph data 122 may be included in updated graph data 124. For example, a new known value (e.g., a non-null value) may be added to a cell that previously included an unknown value (e.g., a null value). The machine 110 also includes an update component 114 to address instances in which the graph data 122 is updated. Based on the updated graph data 124, the update component 114 updates the tree topology bitmap 132, if necessary. For example, if the update to the graph data 122 includes an updated data point that corresponds to a node that did not previously have a child node with a known value, the update component 114 creates an updated tree topology bitmap 142 by updating the tree topology bitmap 132 to indicate that the node now includes at least one child node with a known value thereby making the node a parent node. Additionally, the update component 114 creates an updated archive bit array 144, which is an update to the archive bit array 134, and an updated leaf values array 146, which is an update to the leaf values array 136, based on the updated graph 124. The machine 110 stores a compact data structure 140 comprising the updates to the tree topology bitmap 132, the archive bit array 134, and the leaf values array 136 (e.g., the tree topology bitmap 142, the archive bit array 144, and the leaf values array 146) in the data store 120B in association with a second time stamp ("T2") while maintaining the original versions of the tree topology bitmap 132, the archive bit array 134, and the leaf values array 136 in association with the first timestamp ("T1") thereby creating a history of changes to the graph data 122 while still maintaining compact representations thereof.

Figure 2B:
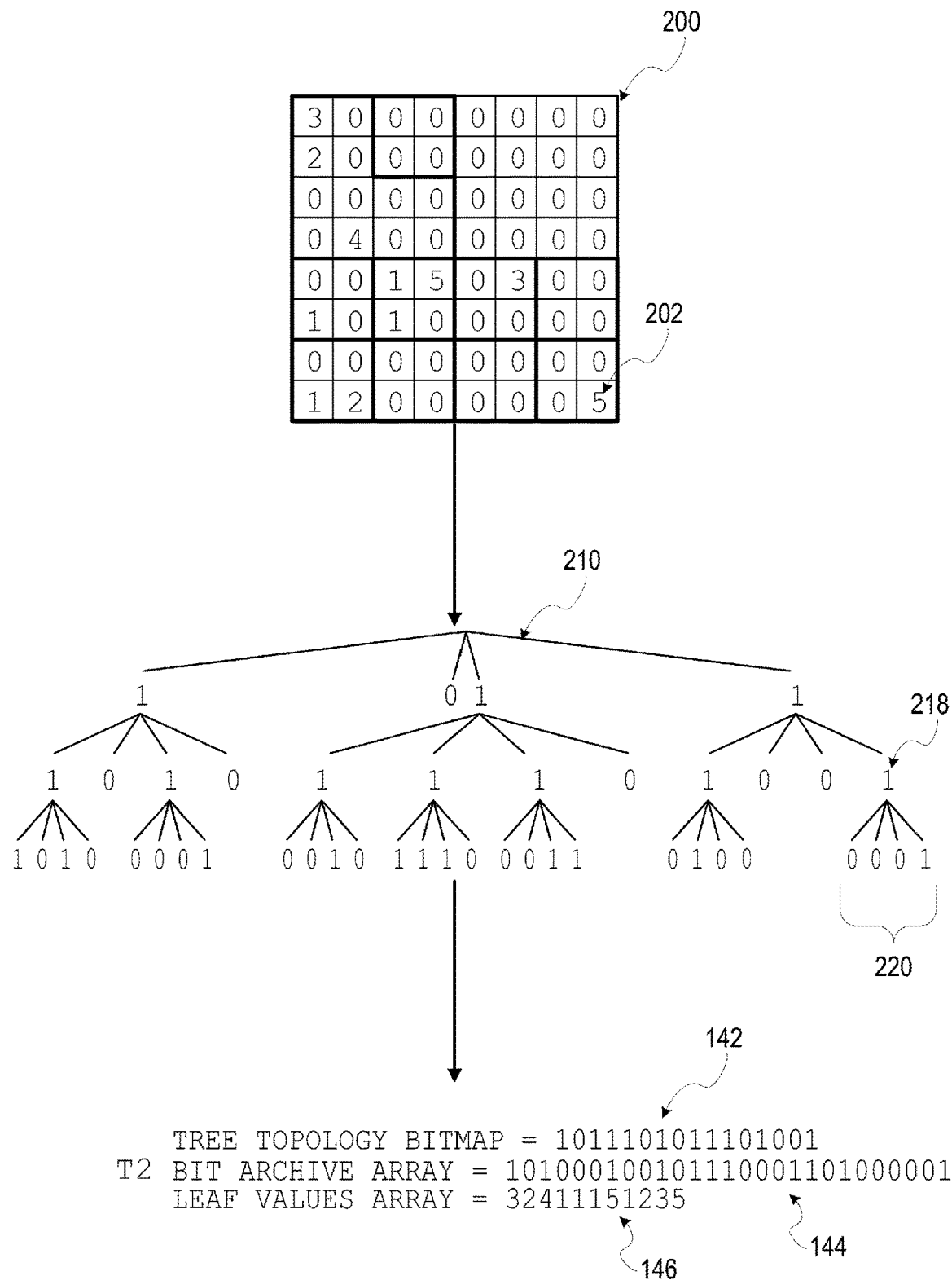

As an example, FIG. 2B illustrates the updated tree topology bitmap 142, the updated archive bit array 144, and the updated leaf values array 146 generated by the machine 110 based on the updated graph data 124. In particular, cell 202 of the matrix 200 has been updated. More specifically, the cell 202, which previously included an unknown value ("0"), has been updated to include a known value ("5"). Accordingly, the update component 114 has updated node 218 of tree data structure 200 to indicate that the corresponding quadrant in the matrix 200 now includes a known value. Further, the tree data structure 200 has been updated to include child nodes 220 branching from the updated node 218. The right most node in the child nodes 220 represents the cell 202, and the value of this node ("1") indicates that the cell 202 now includes a known value ("5").

The update component 114 further creates the updated tree topology bitmap 142, the updated archive bit array 144, and the updated leaf values array 146 by updating the tree topology bitmap 132, the archive bit array 134, and the leaf values array 136 based on the graph data 124. For example, as shown in FIG. 2A, the tree topology bitmap 132 includes the array "1011101011101000" and as shown in FIG. 2B the updated topology bitmap 142 includes the array "1011101011101001." Also, as shown in FIG. 2A, the archive bit array 134 includes the array "10100010010111000110100," while FIG. 2B illustrates the updated archive bit array 144 as including the array "101000100101110001101000001." In addition, as shown in FIG. 2A, the leaf values array 136 includes the array "3241115123," while FIG. 2B illustrates the updated leaf values array 146 as including "32411151235."

Further, as shown in FIG. 2B, the updated tree topology bitmap 142, the updated archive bit array 144, and the updated leaf values array 146 are associated with a second timestamp ("T2"). Further details regarding the updating of the compact data structure 130 are discussed below in reference to FIG. 6, according to some embodiments.

As shown in FIG. 1C, the machine 110 is also configured to facilitate queries to versions of the compact representation (e.g., 130 and 140) of the graph data 122 and updates thereto. To this end, the machine 110 includes a query component 116 configured to query various versions of the compact data structure (e.g., 130 or 140) that respectively represent different versions of the graph data 122 (e.g., updated graph data 124). As shown, the query component 116 may receive a query 150 that specifies a query point by column, row, and time, where the column and row refer to a particular data point in the graph data 122 (e.g., a cell in the matrix 200). The query component 116 uses the time parameter of the query to identify the appropriate version of the compact data structure representing the graph data 122 (e.g., 130 or 140) at the time specified in the query, and uses the column and row to identify the queried data point from the identified version of the compact data structure (e.g., 130 or 140).

Any one or more of functional components illustrated in FIGS. 1A-1C and described herein may be implemented using hardware (e.g., a processor of a machine) or a combination of hardware and software. For example, any component described herein may configure a processor to perform the operations described herein for that component.

Furthermore, to avoid obscuring the inventive subject matter with unnecessary detail, various functional components that are not germane to conveying an understanding of the inventive subject matter have been omitted from FIGS. 1A-1C. However, a skilled artisan will readily recognize that various additional functional components may be supported by the system 100 to facilitate additional functionality that is not specifically described herein. Moreover, any two or more of these components may be combined into a single component, and the functions described herein for a single component may be subdivided among multiple modules. Furthermore, according to various example embodiments, any of the functional components illustrated in FIG. 1 may be implemented together or separately within a single machine, database, or device or may be distributed across multiple machines, databases, or devices. For example, though the data stores 120A and 120B are illustrated as being distinct components, in some embodiments, the data stores 120A and 120B may be combined into a single data store.

Figure 3:
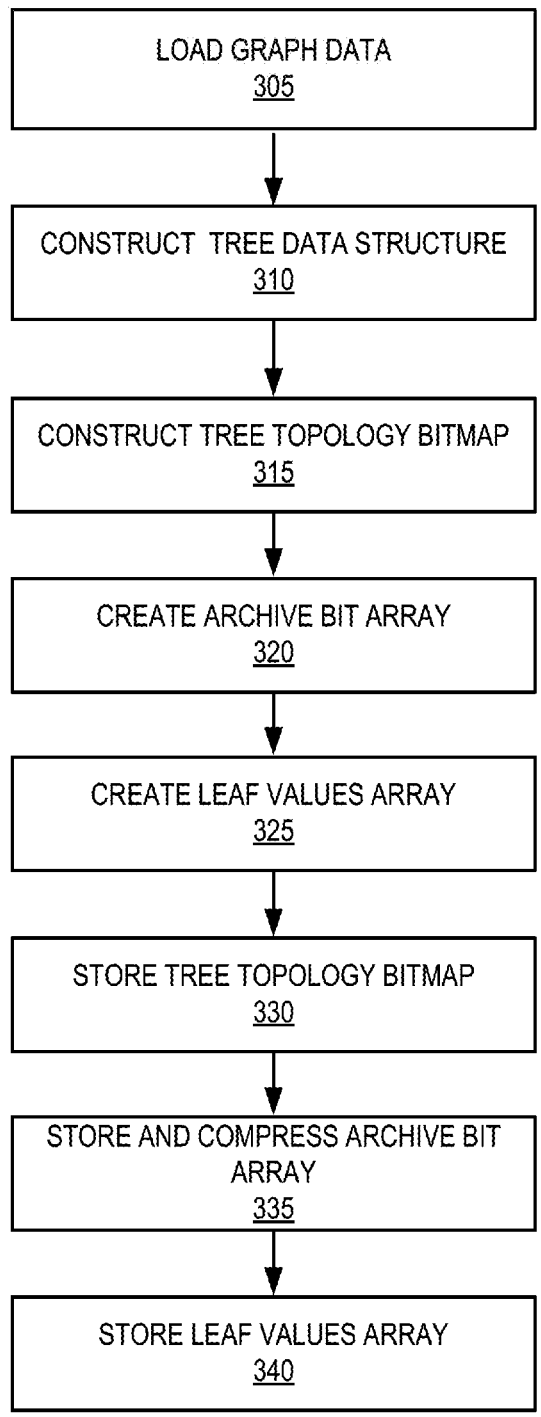
FIG. 3-5 illustrate a flow chart depicting operations of the machine in performing a method for constructing a compact representation of the graph data for efficiently storing the graph data, according to example embodiments.

FIG. 3 is a flow chart depicting operations of the machine 110 in performing a method 300 for constructing a compact representation (e.g., compact data structure 130) of the graph data 122 for efficiently storing the graph data 122, according to example embodiments. The method 300 may be embodied in computer-readable instructions for execution by one or more processors such that the operations of the method 300 may be performed in part or in whole by the machine 110; accordingly, the method 300 is described below by way of example with reference thereto. However, it shall be appreciated that at least some of the operations of the method 300 may be deployed on various other hardware configurations and the method 300 is not intended to be limited to the machine 110.

At operation 305, the construction component 112 loads the graph data 122 into main memory of the machine 110. For example, the construction component 112 may access the graph data 122 from the data store 122 (e.g., via a bus, a shared memory, a switch, or APIs) and loads the accessed graph data 120 into random-access memory (RAM) of the machine 110.

At operation 310, the construction component 112 constructs a tree data structure (e.g., a $K^2$ tree) using the graph data 122. The tree data structure includes a plurality of nodes. Nodes in the tree may include one or more child nodes (e.g., nodes directly connected to the root node), and may thusly be considered parent nodes. Each child node may be a parent node to additional child nodes. In the context of a category tree, each child node may represent a subcategory of the category represented by the parent node. A node with no children is considered a leaf node. Further details regarding the construction of the tree data structure are discussed below in reference to FIG. 4.

At operation 315, the construction component 112 constructs the tree topology bitmap 132 using the tree data structure. As noted above, the tree topology bitmap 132 is an array of values that represent a topology of a portion of the nodes (e.g., all nodes except leaf level nodes) in the tree data structure 210. The construction component 112 may construct the tree topology bitmap 132 by performing a level-order traversal of the tree data structure 210 (e.g., a breadth-first search) where every node on a level is visited from left to right before going to a lower level, though the traversal stops before reaching the leaf node level. Upon visiting a node, the value (e.g., '1' or '0') of the node is read and written to an array that forms the tree topology bitmap 132. Further details regarding the construction of the tree topology bitmap 132 are discussed below in reference to FIG. 5, according to some example embodiments.

At operation 320, the construction component 112 constructs the archive bit array 134 using the tree data structure. As noted above, each element in the archive bit array 134 corresponds to a leaf node in the data tree structure and includes the value of the corresponding leaf node. The value of the corresponding leaf node provides an indication of whether the corresponding element in the graph data 122 includes a known value. The construction component 112 constructs the archive bit array 134 by reading leaf node (e.g., nodes with no children) values (e.g., '1' or '0') in the leaf node level (e.g., the bottom most level of the tree data structure) from left to right, and writing each read leaf node value to an array. The construction component 112 constructs the archive bit array 134 to support rank and select queries.

At operation 325, the construction component 112 creates a leaf values array 136 using the graph data 122. The leaf values array includes a known value (e.g., a non-null value) for each leaf node that corresponds to a data point in the graph data 122 with a known value. The construction component 112 creates the leaf values array 136 by using the tree topology bitmap 132 and the archive bit array 134 to identify data points within the graph data 122 that include known values (e.g., by identifying the elements in the archive bit array 134 that include an entry of '1'), retrieving the known values from the identified data points in the graph data 122, and inserting the retrieved known values into an array. The construction component 112 may identify the data points within the graph data 122 that include known values by performing rank and select queries on the tree topology bitmap 132 and the archive bit array 134 to map elements in the archive bit array 134 to data points in the graph data 122.

At operation 330, the construction component 112 stores the tree topology bitmap 132 in the data store 120B. At operation 335, the construction component 112 compresses and stores the archive bit array 134 in the data store 120B. The construction component 112 uses any compression algorithm suitable for compressing arrays of values to compress the archive bit array 134. For example, the construction component 112 may utilize the Raman, Raman, and Rao (RRR) compression algorithm.

At operation 340, the construction component 112 stores the leaf values array 136 in the data store 120B. The tree topology bitmap 132, the archive bit array 134, and the leaf values array 136 are stored together in association with an initial timestamp. Although the operations 330, 335, and 340 are illustrated and discussed as being performed sequentially, it shall be appreciated that in some embodiments, the operations 330, 335, and 340 may be performed in parallel.

Figure 4:
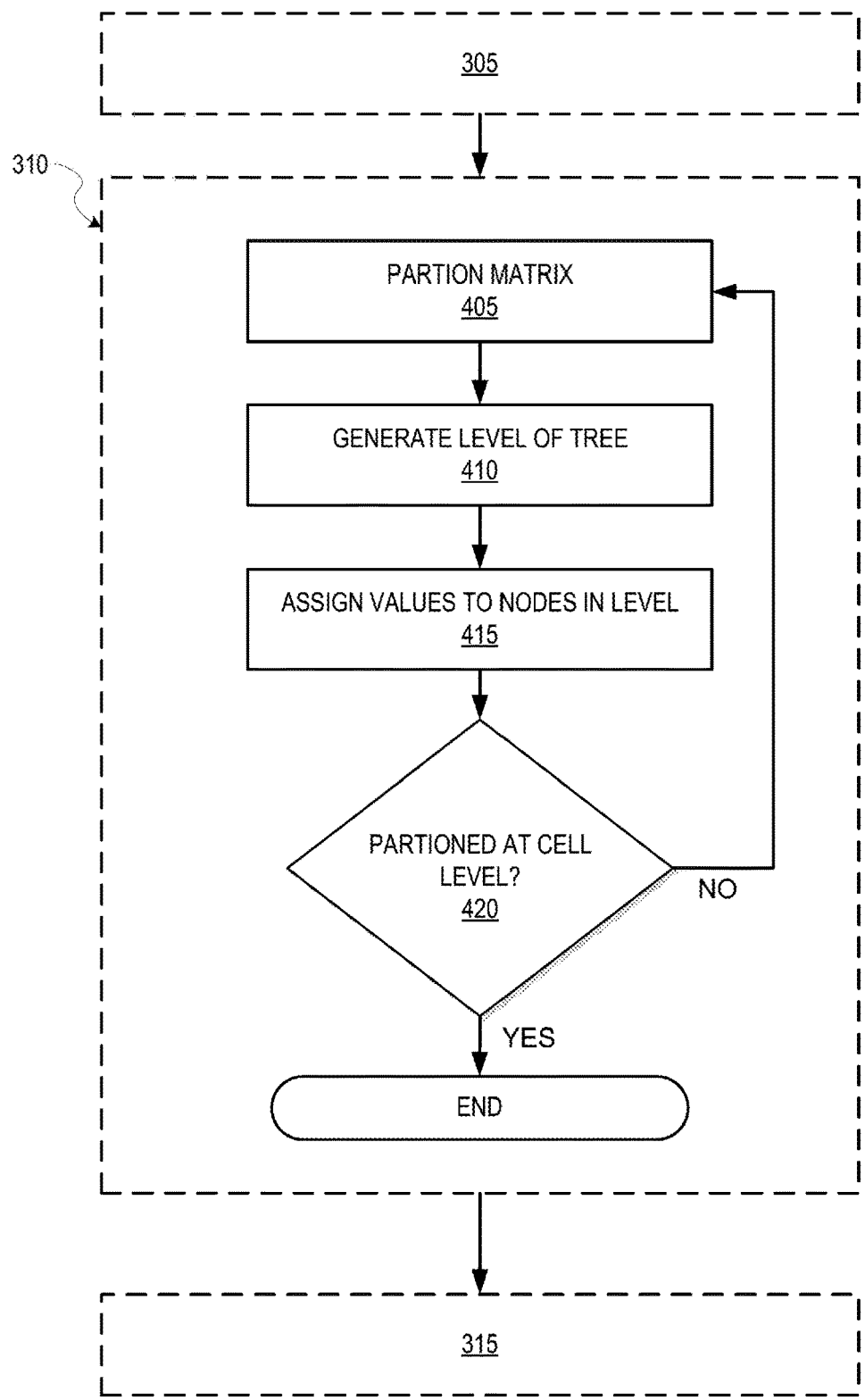

As shown in FIG. 4, the method 300 may include operations 405, 410, 415, and 420. In some example embodiments, operations 405, 410, 415, and 420 included in the method 300 may be performed prior to or as part (e.g., a precursor task, a subroutine, or a portion) of operation 310 of method 300, in which the construction component 112 constructs the tree data structure. For ease of explanation, operations 405, 410, 415, and 420 will be described below in reference FIG. 2A where the graph data 122 is in the example form of the matrix 200.

At operation 405, the construction component 112 partitions (e.g., divides) the matrix 200 into equally sized quadrants. For example, an 8×8 matrix (e.g., a matrix with 8 columns and 8 rows) may be divided into four 4×4 quadrants (e.g., each quadrant having 4 columns and 4 rows). Although the examples discussed herein involve the construction component 112 partitioning the matrix 200 using 2×2 division, it shall be appreciated that in other examples the construction component 112 may partition the matrix 200 using K×K division (e.g., 3×3, 4×4, and so forth).

At operation 410, the construction component 112 generates a level of the tree data structure 210 having a node corresponding to each quadrant. At operation 415, the construction component 112 assigns a value to each node in the level based on whether the corresponding quadrant of the matrix 200 includes a known value. The construction component 112 assigns values to the nodes in the tree data structure 210 from left to right while assessing quadrants in a clockwise manner beginning with the top left quadrant. If the quadrant includes a known value (e.g., a non-null value), the construction component 112 assigns a value of '1' to the corresponding node, and if the quadrant include no known values (e.g., all null values), the construction component 112 assigns a value of '0' to the corresponding node.

As an example, as shown in FIG. 2A, the tree data structure 210 includes a first level 212 having four nodes. Each node in the first level 212 corresponds to a quadrant of the matrix 200, and the value of each node indicates whether the corresponding quadrant includes a known value.

The construction component 112 creates subsequent levels in the tree data structure 210 by returning to the operation 405 where the construction component 112 further portions (e.g., divides) each quadrant into sub-quadrants. Following the example of the 16×16 matrix, the 4×4 quadrants are further divided into 2×2 sub-quadrants (e.g., each sub-quadrant having 2 rows and 2 columns). The construction component 112 adds subsequent levels to the tree data structure 210 (operation 410), and assigns values to nodes in the subsequent levels (operation 415) in the same manner as described above with the exception that no child nodes are created for nodes in the first level that correspond to quadrants with no known values. The nodes in the subsequent levels are child nodes of parent nodes in the previous level.

As an example, as shown in FIG. 2A, the tree data structure 210 includes a second level 214 with an additional 12 nodes. The nodes of the second level 214 are child nodes of parent nodes in the first level 212. Each node in the second level 214 corresponds to a sub quadrant of one of the quadrants that correspond to the nodes of the first level 212. As shown, the second node from the left in the first level 212 includes a value of "0." This node corresponds to the top right quadrant of the matrix 200, which does not have any known values (e.g., non-null values) and accordingly, this node does not include any child nodes in the second level 214.

This process is repeated for each level in the tree data structure 210 until the construction component 112 determines, at operation 420, that the matrix 200 has been portioned down to the cell level (e.g., when each partition includes only one cell). In this way, a value of each leaf node of the tree data structure 210 (e.g., the nodes at the bottom most level of the tree data structure 210) indicates whether a specific cell in the matrix 200 includes a known value (e.g., a non-null value).

As an example, as shown in FIG. 2A, the tree data structure 210 includes leaf level 216. Each leaf node in the leaf level 216 of the tree data structure 210 corresponds to a particular cell (e.g., data point) in the matrix 200 and the value of each leaf node in the leaf level 216 indicates whether the corresponding cell in the matrix 200 includes a known value. For example, if the leaf node includes a value of "1," the corresponding cell in the matrix 200 includes a known value, and if the leaf node includes a value of "0," the corresponding cell in the matrix 200 includes an unknown value (e.g., a null value).

Figure 5:
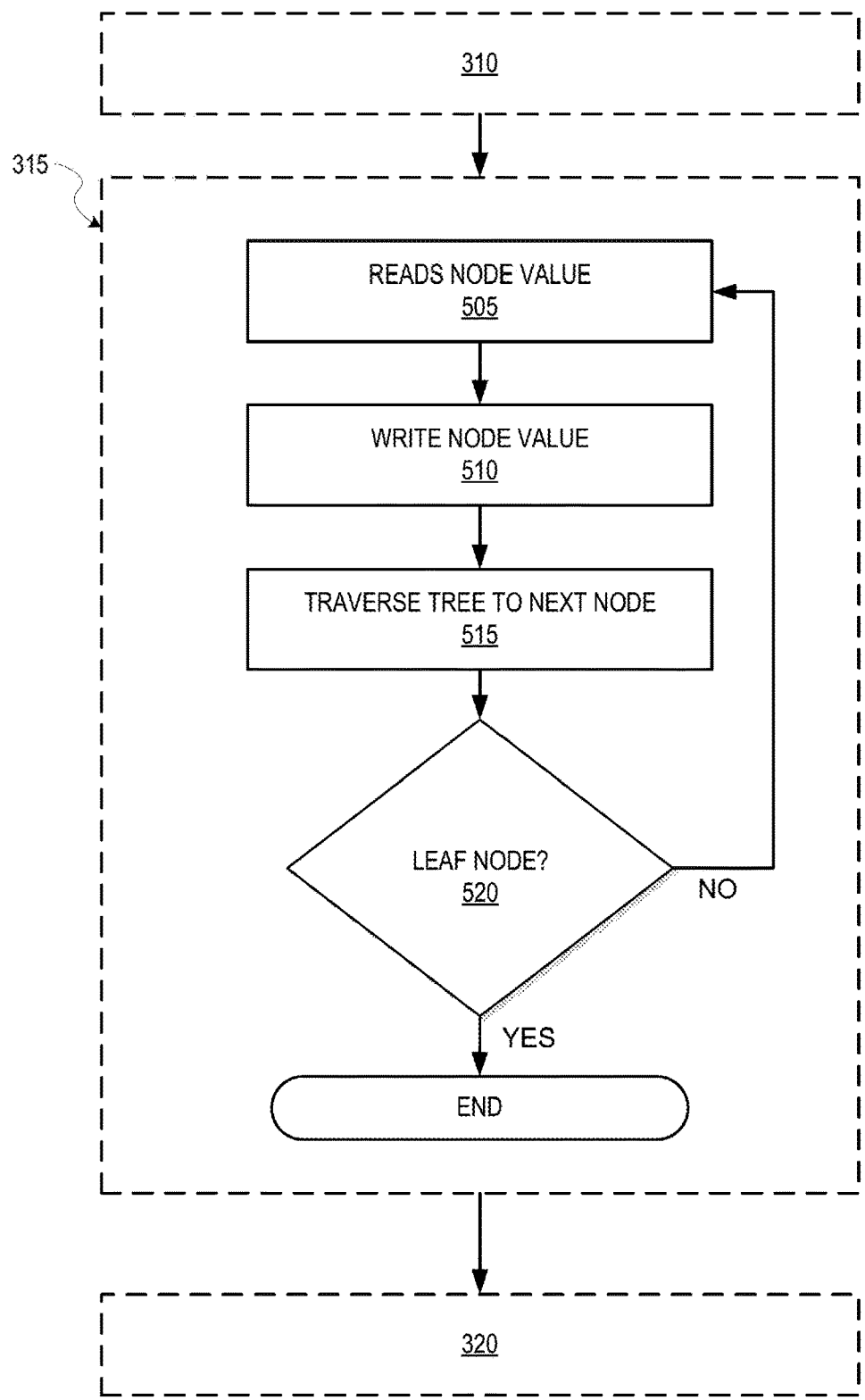

As shown in FIG. 5, the method 300 may include operations 505, 510, 515, and 520. In some example embodiments, operations 505, 510, 515, and 520 included in the method 300 may be performed prior to or as part (e.g., a precursor task, a subroutine, or a portion) of operation 315 of method 300, in which the construction component 112 constructs the tree topology bitmap 132. For ease of explanation, operations 505, 510, 515, and 520 will be described below in reference FIG. 2A where the graph data 122 is in the example form of matrix 200.

In the context of the operations 505, 510, 515, and 520, the construction component 112 begins by visiting the leftmost node of the first level 212 of the tree data structure 210. At operation 505, the construction component 112 reads a node value (e.g., '1' or '0') from the currently visited node. At operation 510, the construction component 112 writes the node value (e.g., '1' or '0') to an array that, when completely populated, forms the tree topology bitmap 132. As an example of operations 505 and 510, as illustrated in FIG. 2A, the first value of the tree topology bitmap 132 is "1," which corresponds to the value of the leftmost node in the first level 212 of the tree data structure 210.

At operation 515, the construction component 112 traverses (e.g., a level order traversal) the tree data structure 210 to visit the next node. If, at operation 520, the construction component 112 determines the next node is a leaf node, the operation 315 ends. Otherwise, the method 300 returns to operation 505, where the construction component 112 reads the value of the next node and writes the value to the array (operation 510). In this way, the construction component 112 visits every node on a level from left to right before going to a lower level, though the traversal stops before reaching the leaf node level. As an example of the foregoing, as shown in FIG. 2A, when performing a level-order traversal of the tree data structure 210 (while ignoring the leaf level nodes), the node values are in the following order: "1011101011101000." Accordingly, as shown in FIG. 2A, the tree topology bitmap 132 is "1011101011101000."

Figure 6:
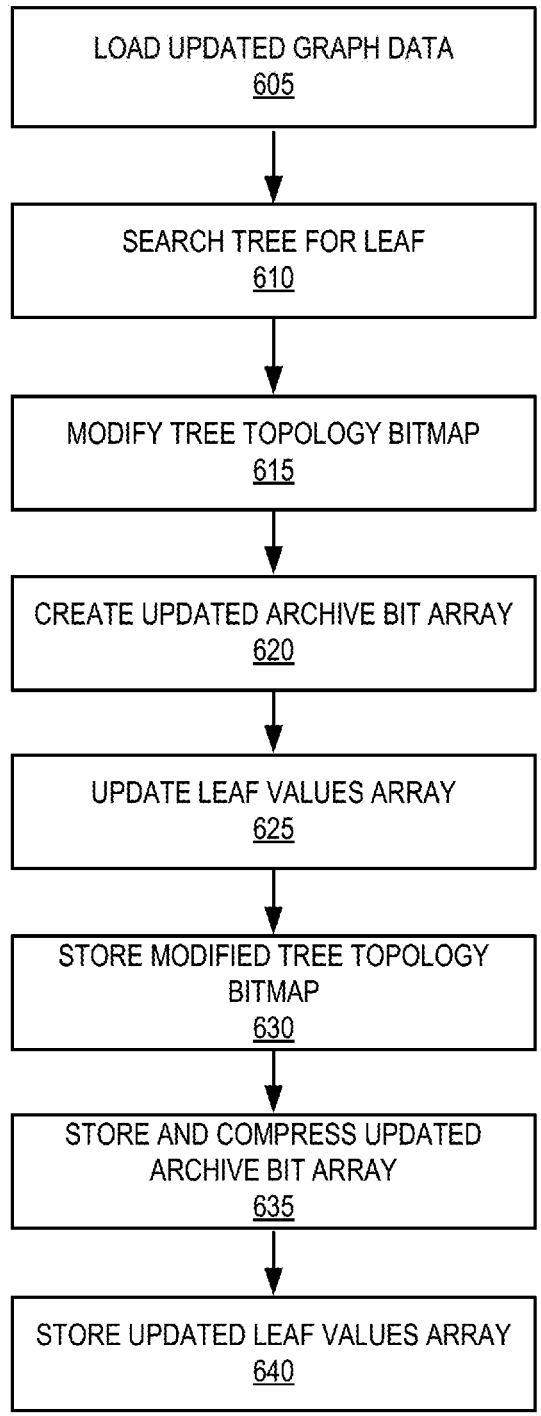
FIG. 6 illustrates a flow chart depicting operations of the machine in performing a method for updating the compact representation of the graph data, according to example embodiments.

FIG. 6 is a flow chart depicting operations of the machine 110 in performing a method 600 for updating the compact representation of the graph data 122, according to example embodiments. The method 600 may be embodied in computer-readable instructions for execution by one or more processors such that the operations of the method 600 may be performed in part or in whole by the machine 110; accordingly, the method 600 is described below by way of example with reference thereto. However, it shall be appreciated that at least some of the operations of the method 600 may be deployed on various other hardware configurations and the method 600 is not intended to be limited to the machine 110. Consistent with some embodiments, the method 600 may be performed subsequent to the method 300, and the method 600 may be repeated at any time when updated graph data 124 (e.g., one or more updates to a data point in the graph data 122) is received.

At operation 605, the update component 114 loads the updated graph data 124 into main memory of the machine 110. For example, the construction component 112 accesses the updated graph data 124 from the data store 122A (e.g., via a bus, shared memory, a switch, or APIs) and loads the accessed updated graph data 124 into random-access memory (RAM) of the machine 110. The updated graph data 124 includes a new value added to a data point in the graph data 122 (e.g., a known value added to a cell in the matrix 200 that previously included an unknown value).

At operation 610, the update component 114 searches the tree data structure 210 to identify a leaf node corresponding to the updated data point (i.e., the data point with the new value). The update component 114 may use the tree topology bitmap 132 and the archive bit array 134 to location the leaf node. For example, the update component 114 may perform select queries on the tree topology bitmap 132 and the archive bit array 134 to map the updated data point to the corresponding leaf node.

At operation 615, the update component 114 modifies (e.g., updates) the tree topology bitmap 132, if necessary, based on the updated graph data 124 thereby resulting in the creation of an updated tree topology bitmap 142. The update component 114 modifies the tree topology bitmap 132 in instances in which the update to the graph data 122 includes an updated data point that corresponds to a node in the tree data structure 210 that did not previously have a child node with a known value. In these instances, responsive to determining that the updated data point corresponds to a node in the tree data structure 210 that did not previously have a child node with a known value, the update component 114 creates an updated tree topology bitmap 142 by updating the tree topology bitmap 132 to indicate that the node now includes at least one child node with a known value thereby making the node a parent node (e.g., by replacing a "0" with a "1").

At operation 620, the update component 114 creates the updated archive bit array 144 by updating the archive bit array 134 based on the updated graph data 124. The update component 114 creates the updated archive bit array 144 by creating a new array, copying the elements of the archive bit array 134 into the new array, and modifying the entry corresponding to the updated data point in the updated graph data 124. In modifying the entry corresponding to the updated data point, the update component 114 may either set or unset the bit in the archive bit array 134 that corresponds to the updated data point.

At operation 625, the update component 114 creates the updated leaf value array 146 by updating the leaf value array 136 based on the updated graph data 124. The update component 114 updates the leaf values array 136 by inserting the updated data point into the appropriate position in the leaf values array 136. The update component identifies the appropriate position for inserting the updated data point by using the updated tree topology bitmap 142 and the updated archive bit array 144. The update component 114 may perform select queries on the tree topology bitmap 142 and the archive bit array 144 to map the updated data point in the updated graph data 124 to the identify the appropriate position in the leaf values array 146 for inserting the updated data point.

At operation 630, the update component 114 stores the updated tree topology bitmap 142 in the data store 120B. At operation 635, the update component 114 compresses and stores the updated archive bit array 144 in the data store 120B. The update component 114 may use any compression algorithm (e.g., RRR) suitable for compressing arrays of values to compress the updated archive bit array 144. At operation 640, the update component 114 stores the updated leaf values array 146 in the data store 120B. The updated tree topology bitmap 142, the updated archive bit array 144, and the updated leaf values array 146 are stored together in association with a subsequent timestamp (e.g., "T2"). Although the operations 630, 635, and 640 are illustrated and discussed as being performed sequentially, it shall be appreciated that in some embodiments, the operations 630, 635, and 640 may be performed in parallel.

Figure 7:
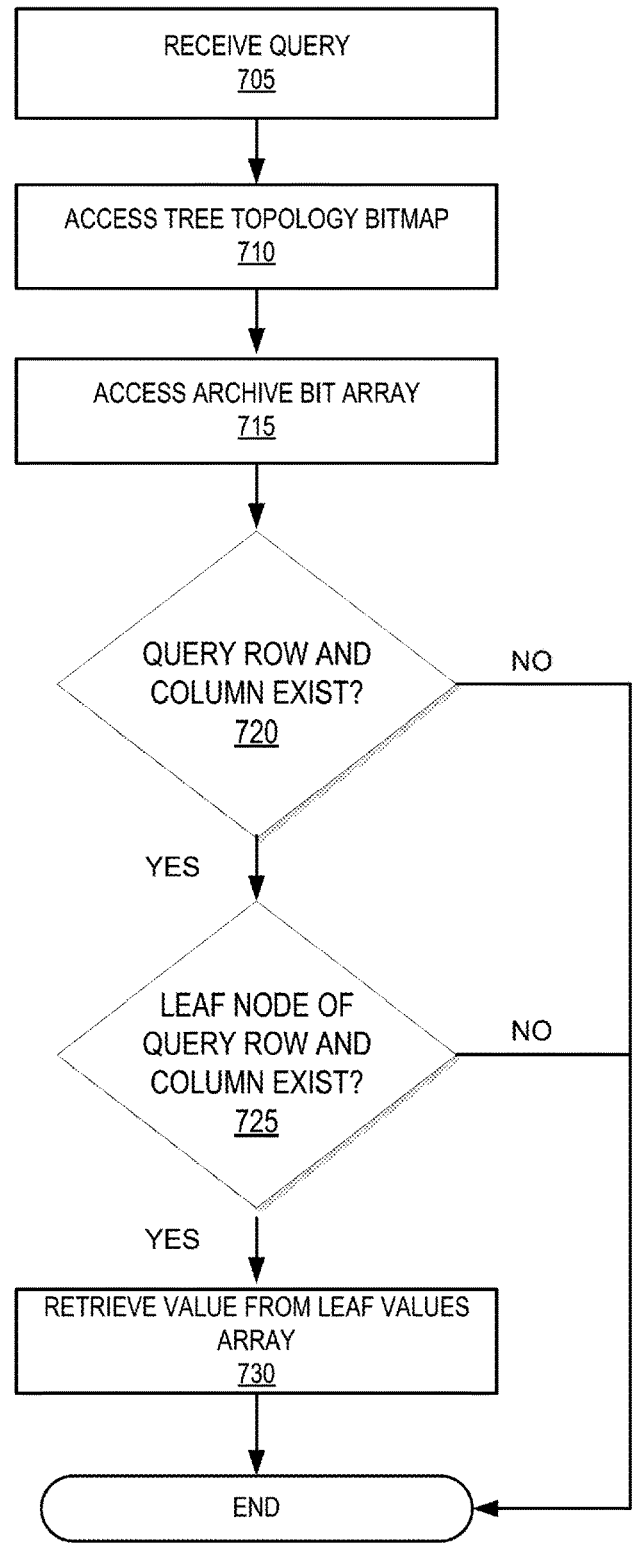
FIG. 7 illustrates a flow chart depicting operations of the machine in performing a method for querying the compact representation of the graph data, according to example embodiments.

FIG. 7 is a flow chart depicting operations of the machine in performing a method 700 for querying the compact representation of the graph data 122, according to example embodiments. The method 700 may be embodied in computer-readable instructions for execution by one or more processors such that the operations of the method 700 may be performed in part or in whole by the machine 110; accordingly, the method 700 is described below by way of example with reference thereto. However, it shall be appreciated that at least some of the operations of the method 700 may be deployed on various other hardware configurations and the method 700 is not intended to be limited to the machine 110. Consistent with some embodiments, the method 700 may be performed subsequent to the method 300, and the method 700 may be repeated at any time when updated graph data 124 (e.g., one or more updates to a data point in the graph data 122) is received.

At operation 705, the query component 116 receives a query. The query may be received from another computing machine such as a server or a client device. For example, the query may be received from a recommendation application executing on a server. The query specifies a query data point by row and column (e.g., with reference to matrix 200) and specifies a time.

At operation 710, the query component 116 loads a particular tree topology bitmap (e.g., tree topology bitmap 132 or updated tree topology bitmap 142) from among multiple tree topology bitmaps. For example, the query component 116 accesses the particular tree topology bitmap from the data store 120B (e.g., via a bus, shared memory, a switch, or APIs) and loads the accessed tree topology bitmap into random-access memory (RAM) of the machine 110. The particular tree topology bitmap accessed from the data store 120B corresponds to the time specified in the query. Following the example presented in FIGS. 2A and 2B, if the query specifies "T1," the query component 116 accesses the tree topology bitmap 132, and if the query specifies "T2," the query component 116 accesses the updated tree topology bitmap 142.

At operation 715, the query component 116 accesses a particular archive bit array (e.g., archive bit array 134 or updated archive bit array 144) from among multiple archive bit arrays stored in the data store 120B. Similar to the tree topology bitmap, the particular archive bit array accessed from the data store 120B corresponds to the time specified in the query. Following the example presented in FIGS. 2A and 2B, if the query specifies "T1," the query component 116 accesses the archive bit array 134, and if the query specifies "T2," the query component 116 accesses the updated archive bit array 144.

At operation 720, the query component 116 determines whether the column and row specified in the query exist in the accessed tree topology bitmap. If, at operation 720, the query component 116 determines the specified column and row do not exist, the method 700 ends because the query point does not exist. The query component 116 may, accordingly, respond to the query with a null response. If, at operation 720, the query component 116 determines the specified column and row do exist, the method 700 continues to operation 725.

At operation 725, the query component 116 determines whether a leaf node of the query row and column exists in the accessed archive bit array. If, at operation 725, the query component 116 determines a leaf node of the query row and column does not exist in the archive bit array, the method 700 ends because the query point does not exist. The query component 116 may, accordingly, respond to the query with a null response. If, at operation 725, the query component 116 determines the leaf node of the query row and column does exist in the archive bit array, the method 700 continues to operation 730.

At operation 730, the query component 116 retrieves the value of the query data point from a leaf values array (e.g., leaf values array 136 or updated leaf values array 146) corresponding to the specified time. The query component 116 identifies the query data point in the leaf values array using the tree topology bitmap and the archive bit array loaded into the machine 110. More specifically, the query component 116 may perform a combination of rank and select queries on the tree topology bitmap and the archive bit array to identify the query data point.

Machine Architecture

Figure 8:
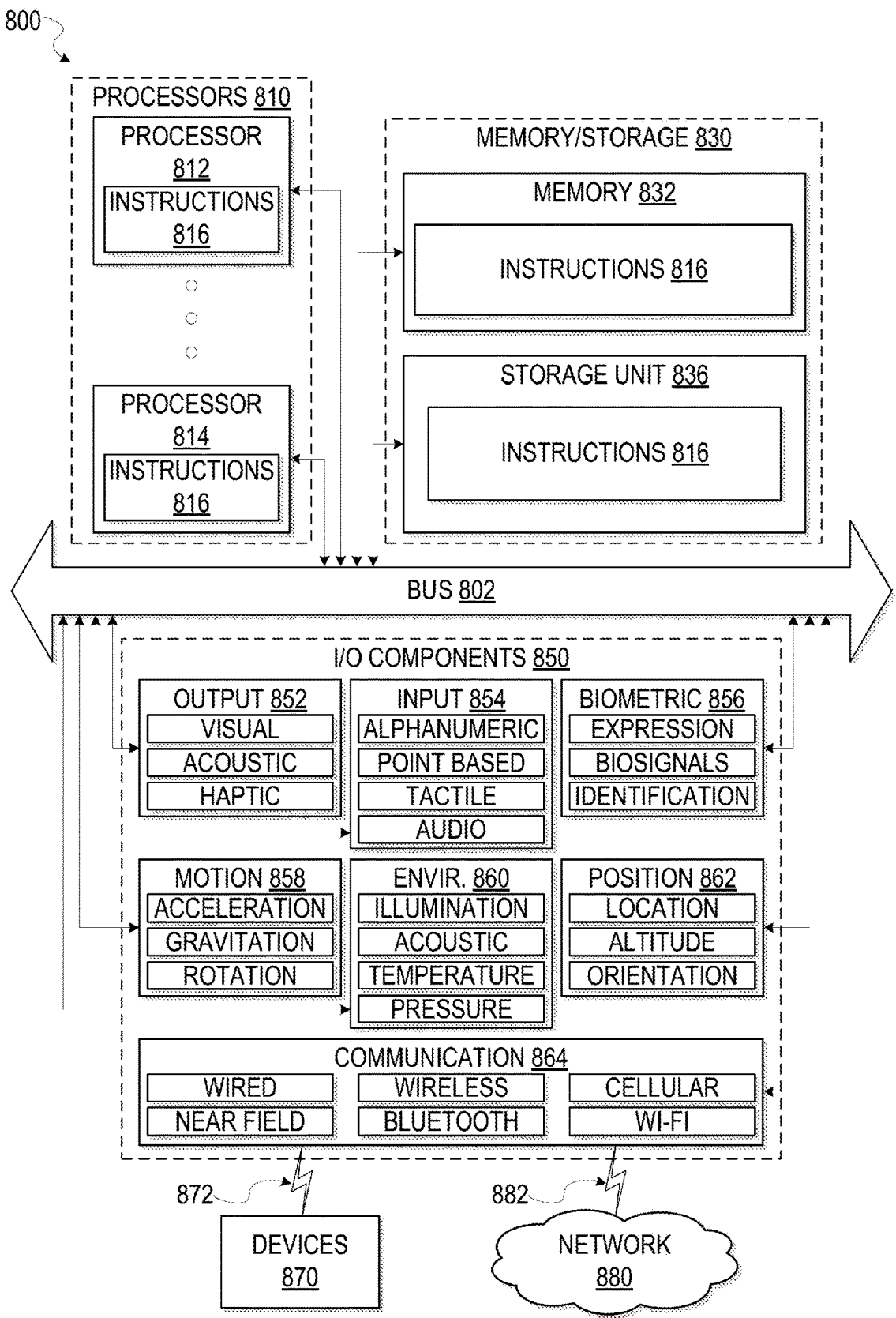
FIG. 8 is a diagrammatic representation of a machine in the example form of a computer system within which a set of instructions for causing the machine to perform any one or more of the methodologies discussed herein may be executed.

FIG. 8 is a block diagram illustrating components of the machine 110, according to some example embodiments, able to read instructions from a machine-readable medium (e.g., a machine-readable storage device) and perform any one or more of the methodologies discussed herein. Specifically, FIG. 8 shows a diagrammatic representation of the machine 110 in the example form of a computer system, within which instructions 816 (e.g., software, a program, an application, an applet, an app, or other executable code) for causing the machine 110 to perform any one or more of the methodologies discussed herein may be executed. For example, the instructions 816 may include executable code that causes the machine 110 to execute any one of the methods 300, 600, or 700. These instructions transform the general, non-programmed machine into a particular machine programmed to carry out the described and illustrated methodologies in the manner described herein. The machine 110 may operate as a standalone device or may be coupled (e.g., networked) to other machines. In a networked deployment, the machine 110 may operate in the capacity of a server machine or a client machine in a server-client network environment, or as a peer machine in a peer-to-peer (or distributed) network environment. By way of non-limiting example, the machine 110 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 110. Further, while only a single machine 110 is illustrated, the term "machine" shall also be taken to include a collection of machines 800 that individually or jointly execute the instructions 816 to perform any one or more of the methodologies discussed herein.

The machine 110 may include processors 810, memory/storage 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 812 and a processor 814 that may execute the instructions 816. The term "processor" is intended to include a multi-core processor 810 that may comprise two or more independent processors (sometimes referred to as "cores") that may execute instructions contemporaneously. Although FIG. 8 shows multiple processors, the machine 110 may include a single processor with a single core, a single processor with multiple cores (e.g., a multi-core processor), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 110. Accordingly, the memory 832, the storage unit 836, and the memory of the processors 810 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 110), such that the instructions, when executed by one or more processors of the machine (e.g., processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 110 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 110, and includes digital or analog communications signals or other intangible media to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Language

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   one or more processors; and
   a computer readable medium storing instructions that, when executed by the one or more processors, cause the system to perform operations comprising:
      receiving a query for a user interaction value of a user with a product, the user interaction value indicated by a tree representation of a two dimensional matrix that comprises user interaction data for a plurality of products, the tree representation comprising a tree topology bitmap that represents a topology of a tree data structure and an archive bit array comprising a plurality of elements corresponding to leaf nodes in the tree data structure;
      determining that a leaf node of a leaf values array corresponding to the query exists in the archive bit array based at least in part on the tree topology bitmap and the archive bit array, the leaf values array comprising a plurality of entries, each entry comprising a non-binary value corresponding to a cell in the two dimensional matrix with a known value at a location defined by the tree topology bitmap and the archive bit array; and
      outputting the user interaction value as an entry from the leaf values array of the tree data structure based at least in part on the leaf node existing in the archive bit array.

2. The system of claim 1, wherein the instructions are further executable to perform operations comprising:
   receiving the query that indicates a time corresponding to the user interaction value; and
   outputting the user interaction value as the entry from the leaf values array based at least in part on the query for the user interaction value and the indicated time.

3. The system of claim 1, wherein the instructions are further executable to perform operations comprising:
   receiving the query that indicates a column and a row corresponding to the user interaction value; and
   outputting the user interaction value as the entry from the leaf values array based at least in part on identifying that the column and the row exist in the tree representation of the two dimensional matrix.

4. The system of claim 1, wherein the instructions are further executable to perform operations comprising:
   receiving a second query that indicates a row and a column corresponding to a second user interaction value; and
   outputting the second user interaction value as a defined value based at least in part on identifying that the column and the row do not exist in the tree representation of the two dimensional matrix.

5. The system of claim 1, wherein the instructions are further executable to perform operations comprising:
   receiving the query that indicates a row of the two dimensional matrix corresponding to the user.

6. The system of claim 1, wherein instructions are further executable to perform operations comprising:
   receiving the query that indicates a column of the two dimensional matrix corresponding to the product.

7. The system of claim 1, further comprising:
   receiving the query from a recommendation application of a server.

8. A computer implemented method comprising:
   receiving a query for a user interaction value of a user with a product, the user interaction value indicated by a tree representation of a two dimensional matrix that comprises user interaction data for a plurality of products, the tree representation comprising a tree topology bitmap that represents a topology of a tree data structure and an archive bit array comprising a plurality of elements corresponding to leaf nodes in the tree data structure;
   determining, by one or more processors, that a leaf node of a leaf values array corresponding to the query is absent from the archive bit array based at least in part on the tree topology bitmap and the archive bit array, the leaf values array comprising a plurality of entries, each entry comprising a non-binary value corresponding to a cell in the two dimensional matrix with a known value at a location defined by the tree topology bitmap and the archive bit array; and
   outputting the user interaction value as a defined value based at least in part on the leaf node being absent from the archive bit array.

9. The computer implemented method of claim 8, further comprising:
   receiving the query that indicates a time corresponding to the user interaction value; and outputting the user interaction value as the defined value based at least in part on the query for the user interaction value and the indicated time.

10. The computer implemented method of claim 8, further comprising:
receiving a second query that indicates a column and a row corresponding to a second user interaction value; and
outputting the second user interaction value as an entry from the leaf values array based at least in part on identifying that the column and the row exist in the tree representation of the two dimensional matrix.

11. The computer implemented method of claim 8, further comprising:
receiving the query that indicates a row and a column corresponding to the user interaction value; and
outputting the user interaction value as the defined value based at least in part on identifying that the column and the row do not exist in the tree representation of the two dimensional matrix.

12. The computer implemented method of claim 8, further comprising:
receiving the query that indicates a row of the two dimensional matrix corresponding to the user.

13. The computer implemented method of claim 8, further comprising:
receiving the query that indicates a column of the two dimensional matrix corresponding to the product.

14. The computer implemented method of claim 8, further comprising:
receiving the query from a recommendation application of a server.

15. A non-transitory computer-readable medium storing instructions which, when executed by a processor, cause the processor to perform operations comprising:
receiving a query for a user interaction value of a user with a product, the user interaction value indicated by a tree representation of a two dimensional matrix that comprises user interaction data for a plurality of products, the tree representation comprising a tree topology bitmap that represents a topology of a tree data structure and an archive bit array comprising a plurality of elements corresponding to leaf nodes in the tree data structure;
determining that a leaf node of a leaf values array corresponding to the query exists in the archive bit array based at least in part on the tree topology bitmap and the archive bit array, the leaf values array comprising a plurality of entries, each entry comprising a non-binary value corresponding to a cell in the two dimensional matrix with a known value at a location defined by the tree topology bitmap and the archive bit array; and
outputting the user interaction value as an entry from the leaf values array of the tree data structure based at least in part on the leaf node existing in the archive bit array.

16. The non-transitory computer-readable medium of claim 15, wherein the instructions, when executed, further cause the processor to perform operations comprising:
receiving the query that indicates a time corresponding to the user interaction value; and
outputting the user interaction value as the entry from the leaf values array based at least in part on the query for the user interaction value and the indicated time.

17. The non-transitory computer-readable medium of claim 15, wherein the instructions, when executed, further cause the processor to perform operations comprising:
receiving the query that indicates a column and a row corresponding to the user interaction value; and
outputting the user interaction value as the entry from the leaf values array based at least in part on identifying that the column and the row exist in the tree representation of the two dimensional matrix.

18. The non-transitory computer-readable medium of claim 15, wherein the instructions, when executed, further cause the processor to perform operations comprising:
receiving a second query that indicates a row and a column corresponding to a second user interaction value; and
outputting the second user interaction value as a defined value based at least in part on identifying that the column and the row do not exist in the tree representation of the two dimensional matrix.

19. The non-transitory computer-readable medium of claim 15, wherein the instructions, when executed, further cause the processor to perform operations comprising:
receiving the query that indicates a row of the two dimensional matrix corresponding to the user.

20. The non-transitory computer-readable medium of claim 15, wherein the instructions, when executed, further cause the processor to perform operations comprising:
receiving the query that indicates a column of the two dimensional matrix corresponding to the product.

* * * * *